UNITED STATES PATENT OFFICE.

GEORGE CLARENCE WOOLLEY, OF NEW YORK, N. Y.

PRINTING-INK COMPOSITION.

1,237,136.	Specification of Letters Patent.	Patented Aug. 14, 1917.

No Drawing.	Application filed March 28, 1917. Serial No. 158,068.

*To all whom it may concern:*

Be it known that I, GEORGE CLARENCE WOOLLEY, a citizen of the United States, residing at New York, in the county of New York and State of New York, have invented new and useful Improvements in Printing-Ink Compositions, of which the following is a specification.

The present invention relates to a composition suitable for use as ink when ground with suitable pigments, such as carbon black, chrome yellow, etc., and capable of taking the place of linseed oil varnish. It is free from odor, works clean on the press, does not form a skin as linseed varnish does on the rollers, which does away with washing up so often.

In producing the ink I preferably proceed as follows:

I first dissolve oleic or stearic acids, or the corresponding glycerids, in an alkaline solution, for example caustic soda, as in the production of ordinary soaps. The liquid resulting is then purified or filtered if desirable, after which a metallic salt, such as aluminum sulfate, is added. This produces a precipitate of an aluminum soap, such as aluminum oleate or aluminum stearate, which material forms the basis of the ink made in accordance with my invention.

I dissolve about 10 parts of such an aluminum soap in about 90 parts of a hydrocarbon oil, which may be produced by mixing filtered cylinder stock of a gravity of about 23° Bé., and a light oil having a gravity of about 40° Bé., known as #28 paraffin oil. Without limiting myself to proportions, I preferably employ the particular cylinder and light oil referred to in about the proportions of 2 parts of the cylinder and 1 part of the lighter oil.

In some instances I have omitted the above mentioned oils and use an oil known as "300° oil" having a gravity of about 40° Bé. alone, and produce an ink which is quickly absorbed and produces splendid results in practice. In omitting the cylinder oil, I preferably employ a larger amount of aluminum soap, e. g. about 25 parts of the oleate to 75 parts of the oil.

To the aluminum soap, before mixing with the oily vehicle, or to the mixture of aluminum soap and oily vehicle, I add any suitable pigment, in amount necessary to produce the desired shade of color. I can use various pigments for this purpose, and I call attention to the fact that lead salts, particularly those of a basic nature are as suitable for use in this invention as any of the other pigments.

In employing the ink in printing, the mineral oil is absorbed by the paper, leaving the oleate or stearate and the pigment on the paper, which dries to produce a finish equal to that produced by the use of linseed oil.

Without limiting myself to the exact proportions or materials, I give the following specific example of an ink made in accordance with this invention.

| | |
|---|---|
| Heavy cylinder oil, 23° Bé | 40 parts |
| Light mineral oil, 40° Bé | 5 parts |
| Aluminum oleate | 5 parts |
| Pigment (chrome yellow) | 50 parts |

What I claim:

A printing ink composition comprising an aluminum salt of a fatty acid, a hydrocarbon mineral oil not lighter than about 40° Bé., and a pigment.

In testimony whereof I affix my signature.

GEORGE CLARENCE WOOLLEY.